United States Patent
Solum et al.

(10) Patent No.: US 9,661,425 B2
(45) Date of Patent: May 23, 2017

(54) METHOD AND APPARATUS FOR RENDERING AUDIO IN WIRELESS HEARING INSTRUMENTS

(71) Applicant: Starkey Laboratories, Inc., Eden Prairie, MN (US)

(72) Inventors: Jeffrey Paul Solum, Shorewood, MN (US); Mohammed Movahedi, Eden Prairie, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 165 days.

(21) Appl. No.: 14/595,739

(22) Filed: Jan. 13, 2015

(65) Prior Publication Data

US 2015/0201289 A1 Jul. 16, 2015

Related U.S. Application Data

(60) Provisional application No. 61/927,669, filed on Jan. 15, 2014.

(51) Int. Cl.
| H04B 7/00 | (2006.01) |
| H04R 25/00 | (2006.01) |

(Continued)

(52) U.S. Cl.
CPC ........... H04R 25/554 (2013.01); H04R 25/55 (2013.01); H04R 25/552 (2013.01);
(Continued)

(58) Field of Classification Search
USPC ..................................... 455/41.1–41.3, 550.1
See application file for complete search history.

(56) References Cited

U.S. PATENT DOCUMENTS

| 2004/0037442 A1* | 2/2004 | Nielsen | H04R 25/554 |
| | | | 381/315 |
| 2011/0158264 A1* | 6/2011 | Philips | H04J 3/062 |
| | | | 370/516 |

(Continued)

FOREIGN PATENT DOCUMENTS

| EP | 2341744 A2 | 7/2011 |
| WO | WO-2011098140 A1 | 8/2011 |

OTHER PUBLICATIONS

"European Application Serial No. 15151348.8, Extended European Search Report mailed Jul. 24, 2015", 7 pgs.

(Continued)

*Primary Examiner* — Fayyaz Alam
(74) *Attorney, Agent, or Firm* — Schwegman, Lundberg & Woessner, P.A.

(57) ABSTRACT

An audio system such as a hearing assistance system includes an audio source device wirelessly communicating with one or more audio sink (destination) devices. The audio source and sink devices each include a sample clock for processing audio signal that is digitized and wirelessly transmitted. The sample clock of each of the one or more audio sink devices is synchronized to the sample clock of the audio source device to prevent audio sample over-runs or under-runs causing undesirable audio artifacts. In one embodiment, because audio packets may be lost in transmission, packet loss concealment techniques are used to improve audio reproduction. In one embodiment, link layer information is used for audio phase lock loop jitter reduction in the audio system.

22 Claims, 5 Drawing Sheets

(51) Int. Cl.
 *H04W 4/00* (2009.01)
 *H04W 56/00* (2009.01)
(52) U.S. Cl.
 CPC ......... *H04W 4/008* (2013.01); *H04W 56/002* (2013.01); *H04R 2225/55* (2013.01)

(56) References Cited

U.S. PATENT DOCUMENTS

| | | | | |
|---|---|---|---|---|
| 2011/0235836 | A1* | 9/2011 | Boguslavskij | H04L 7/041 381/315 |
| 2012/0033620 | A1* | 2/2012 | Thoen | H04J 3/0697 370/329 |
| 2012/0310394 | A1* | 12/2012 | El-Hoiydi | H04B 7/0667 700/94 |
| 2016/0192091 | A1* | 6/2016 | Polinske | H04R 25/554 381/315 |
| 2016/0234612 | A1* | 8/2016 | Solum | H04R 25/554 |

OTHER PUBLICATIONS

"European Application Serial No. 15151348.8, Communication Pursuant to Article 94(3) EPC mailed Apr. 21, 2016", 5 pgs.
"European Application Serial No. 15151348.8, Response filed Feb. 25, 2016 to Extended European Search Report mailed Jul. 24, 2015", 16 pgs.

\* cited by examiner

METHOD AND APPARATUS FOR RENDERING AUDIO IN WIRELESS HEARING INSTRUMENTS

CLAIM OF PRIORITY

The present application claims the benefit of priority under 35 U.S.C. §119(e) of U.S. Provisional Patent Application Ser. No. 61/927,669, filed on Jan. 15, 2014, which application is incorporated herein by reference in its entirety.

TECHNICAL FIELD

This document relates generally to audio systems and more particularly a method and apparatus for rendering audio in one or more hearing instruments coupled to an audio source via a wireless communication link.

BACKGROUND

One or more hearing instruments may be worn on one or both sides of a person's head to deliver sounds to the person's ear(s). An example of such hearing instruments includes a pair of hearing aids that are used to assist a patient suffering hearing loss by transmitting amplified sounds to ear canals. In some examples, the one or more hearing instruments receive audio from an audio source via a wireless communication link. To ensure quality of the sound delivered to the person's ear(s), there is a need to coordinate the one or more hearing instruments for processing the wirelessly received audio under various practical conditions.

SUMMARY

An audio system such as a hearing assistance system includes an audio source device wirelessly communicating with one or more audio sink (destination) devices. The audio source and sink devices each include a sample clock for processing audio signal that is digitized and wirelessly transmitted. The sample clock of each of the one or more audio sink devices is synchronized to the sample clock of the audio source device to prevent audio sample over-runs or under-runs causing undesirable audio artifacts. In one embodiment, because audio packets may be lost in transmission, packet loss concealment techniques are used to improve audio reproduction. In one embodiment, link layer information is used for audio phase lock loop jitter reduction in the audio system.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
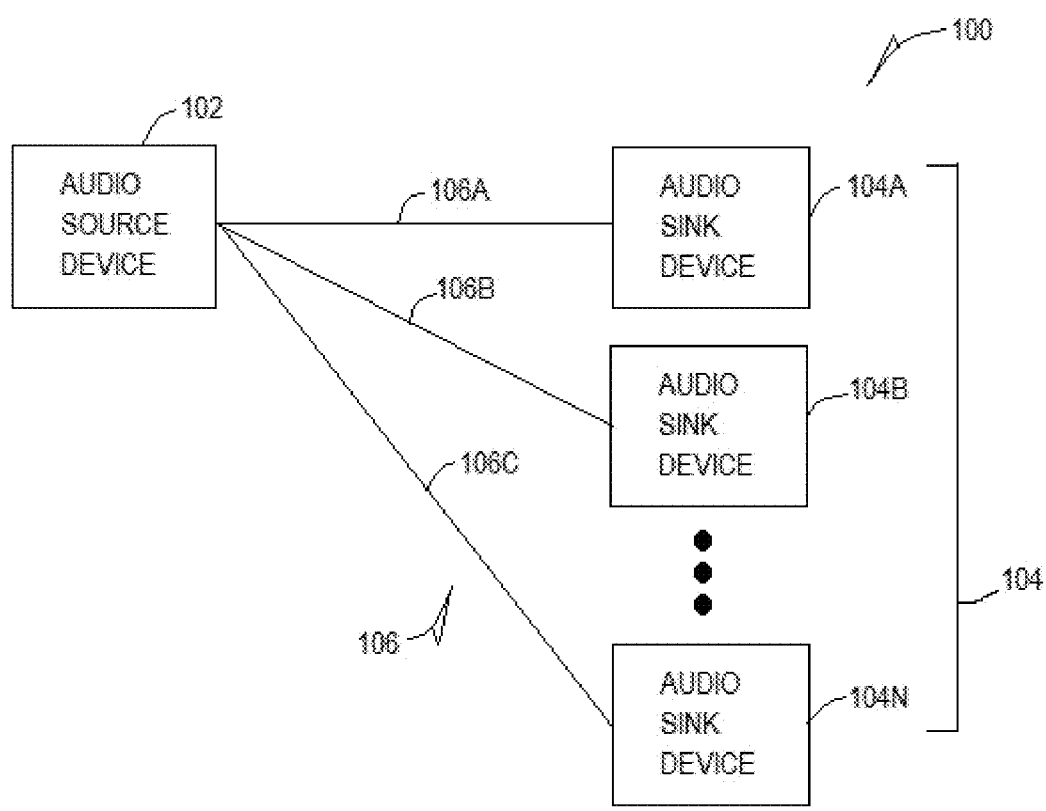
FIG. 1 is a block diagram illustrating an embodiment of an audio system including audio source and audio sink devices.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present document discusses an audio system, such as a hearing assistance system, that includes an audio source device wirelessly communicating with one or more audio sink (destination) devices. The audio source and sink devices each include a sample clock for acoustic signal processing. The sample clock of each of the one or more audio sink devices is synchronized to the sample clock of the audio source device to prevent audio sample over-runs or under-runs causing undesirable audio artifacts. In various embodiments, because audio packets may be lost in transmission, packet loss concealment techniques are used to improve audio reproduction.

In various embodiments, the sample clock of an audio sink device is synchronized to the sample clock of an audio source device using a radio employing a packet based method of transmission based on a receive time slot. The synchronization is maintained by timing the arrival of an audio packet using an adjustable oscillator and making adjustments to that oscillator. In various embodiments, the adjustable oscillator includes an RC type oscillator with an adjustable resistance or capacitance, a voltage-controlled oscillator (VCO), a current-controlled oscillator (ICO), or a digital numerically controlled oscillator.

In various embodiments, the link layer of a radio is used to determine when a packet is missed, sent with errors or is empty, thereby aiding the signal processor of an audio sink device in maintaining accurate synchronization using an adjustable oscillator. In various embodiments, the adjustable oscillator includes an RC type oscillator with an adjustable resistance or capacitance, a VCO, an ICO, or a digital numerically controlled oscillator.

In various embodiments, the link layer of a radio is used to determine when a packet is missed, sent with errors or is empty for the purpose of employing a packet loss concealment strategy for the missing, empty, or packet received in error.

In various embodiments, the link layer of a radio is used to determine whether a packet received was on the primary transmission or on one of multiple retransmission attempts, thus allowing successful maintenance of an output sample rate regardless of the arrival time of the packet and on which retransmission a successful reception took place.

FIG. 1 is a block diagram illustrating an embodiment of an audio system 100 including an audio source device 102, audio sink devices 104, and a wireless communication network 106. In the illustrated embodiment, audio sink devices 104 includes audio sink device 104A coupled to audio source device 102 via wireless communication link 106A, audio sink device 104B coupled to audio source device 102 via wireless communication link 106B, . . . , audio sink device 104N coupled to audio source device 102 via wireless communication link 106N. In various embodiments, N is an integer equal to or greater than 1. In various embodiments, audio sink devices 104 include a hearing instrument configured to be worn by a person (hearing instrument wearer) to deliver sound to that person. Audio source devices 102 transmits an acoustic signal to each of audio sink device 104A-N via wireless communication link 106A-N, such as a Bluetooth® link, respectively.

Modern hearing instruments employ digital processing techniques to enhance the intelligibility of incoming acoustic information for the hearing instrument wearer. In addition, modern hearing instruments have wireless connectivity to audio sources such as cellphones, computers including desktop, laptop, and tablet computers, and other devices that can send and receive digital audio information. Other devices such as wireless headphones process digital audio information in a similar manner. Most wireless standards such as Bluetooth employ audio compressor-decompressors (CODECs) to compress audio information before sending it over the air to limit the amount of data to be sent wirelessly to remote audio sink devices and to enhance the performance of the wireless link. In order for the wireless audio sink devices receiving the information to playback the transmitted information without unwanted audio artifacts, such devices employ digital and analog techniques to synchronize the output sample clock with the input sample clock at the audio source device. In addition, these wireless audio sink devices must cope with the possibility that the transmitted information may be lost in the wireless communication link due to interference, multipath fading, and/or the like. To improve synchronization, several techniques such as digital multi-rate filtering, clock tracking, packet loss concealment and the like are employed. Digital techniques may require significant over sampling or resampling based on polyphase multi-rate filtering techniques to achieve "artifact free" audio playback.

In various embodiments in which audio sink devices 104 include hearing aids, the hearing instrument wearer uses two hearing instruments each rendering left and right audio channels independently. To maintain a comfortable listening environment it is essential that these two channels are rendered coherent with each other within a small timing offset. This further increases the need for audio sample accuracy between the two independent audio sink devices.

In various embodiments, audio source device 100 and audio sink devices 104 each include a sample clock for processing audio signal that is digitized and transmitted via wireless communication network 106. The sample clock of each of audio sink devices 104A-N is synchronized to the sample clock of the audio source device 102 to prevent audio sample over-runs or under-runs causing undesirable audio artifacts. In various embodiments, because audio packets may be lost in transmission, packet loss concealment techniques are used to improve audio reproduction.

Figure 2:
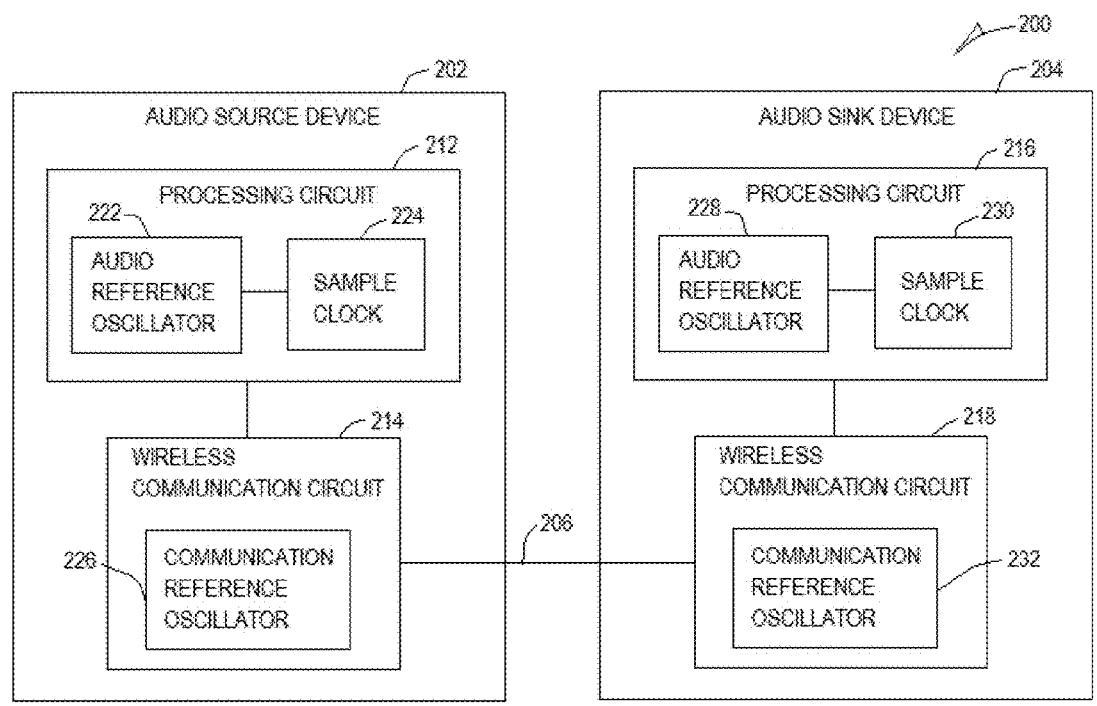
FIG. 2 is a block diagram illustrating an embodiment of a pair of audio source and audio sink devices with synchronized audio sample clocks.

FIG. 2 is a block diagram illustrating an embodiment of an audio system 200 including an audio source device 202 and an audio sink device 204. System 200 represents an example of system 100 for the purpose of illustrating portions of a circuit of audio source and sink devices. Audio source device 202 represents an example of audio source device 102. Audio sink device 204 represents an example of one of audio sink devices 104A-N. While one pair of audio source and sink devices is illustrated in FIG. 2, system 200 may include two or more audio sink devices each operating as discussed for audio sink device 204.

The portions of the circuit of audio source device 202 include a processing circuit 212 and a wireless communication circuit 214. The processing circuit 212 is configured to process an acoustic signal for transmission to audio sink device 204 via wireless communication link 206 and includes an audio reference oscillator 222 and a sample clock 224. Sample clock 224 times the input sampling of the acoustic signal based on the frequency generated by audio reference oscillator 222. Wireless communication circuit 214 provides an interface to wireless communication link 206 and includes a radio circuit with a communication reference oscillator (also referred to as RF oscillator) 226 for generating an RF (radio frequency) signal for the wireless transmission of the digitized acoustic signal.

The portions of the circuit of audio sink device 204 include a processing circuit 216 and a wireless communication circuit 218. The processing circuit 216 is configured to process the acoustic signal transmitted from audio source device 202 via wireless communication link 206 and includes an audio reference oscillator 228 and a sample clock 230. Sample clock 230 times the output sampling of the acoustic signal based on the frequency generated by audio reference oscillator 228. Wireless communication circuit 218 provides an interface to wireless communication link 206 and includes a radio circuit a communication reference oscillator (also referred to as RF oscillator) 232 for demodulating the received acoustic signal.

In various embodiments, processing circuit 216 includes a digital signal processor (DSP). Low power DSPs typically employ clock sources based on RC oscillators, voltage controlled oscillators (VCOs) and current controlled oscillators (ICOs). Such oscillators drive the system clocks on these DSPs and ultimately drive the output sample rate (from sample clock 230). Radios operating at high frequencies such as 2.4 GHz require much greater frequency stability and accuracy in order to perform successful over the air reception and transmission of data. Such devices use high accuracy frequency references such as crystal oscillators, resonators, or MEMS type oscillators. The DSP in a hearing instrument may, depending on the application, benefit from the addition of such accurate frequency references. Given the size constraints of a hearing instrument worn on or in the ear it is somewhat impractical to have two crystal reference oscillators within the device, one for the RF reference and one for the audio reference. In other words, using crystal reference oscillators for both communication reference oscillator 232 and audio reference oscillator 228 may not be a practical solution to the problem of providing frequency stability and accuracy.

It should be noted that in most cases, sample clock 224 and communication reference oscillator 214 of audio source device 202 are not necessarily locked together, and sample clock 230 and communication reference oscillator 232 of audio sink device 204 are not necessarily locked together, either. Consequently, audio sink device 204 should make no assumption about the relationship between communication (RF) clock and audio clock in standardized communication such a Bluetooth. An audio source device may derive its sample rate from highly accurate reference such as crystal oscillators and the like but do not necessarily have their RF radio frequency and packet timing based on the same oscillator that the audio sample clock is derived from.

Therefore it is necessary for the audio sink device to lock its audio sample rate to audio sample rate of the audio source device to avoid dropping or adding samples periodically which would cause audio artifacts. In system 200, audio sink device 204 can adjust its sample clock 230 based on time stamps between packet arrivals and the number of encoded words received in each incoming packet. Audio source device 202 may send a variable number of encoded words in each packet since the timing for the RF packet arrival is not synchronized with the audio encoder. Audio sink device 204, knowing how many system clock signals it should expect between packet arrivals when adjusted for the number of arrived encoded samples, can form an error signal that it can use to drive audio reference oscillator 228. In various embodiments, audio reference oscillator 228 includes an RC oscillator with an adjustable resistance or adjustable capacitance, a VCO, an ICO, or a digital numerically controlled oscillator, such that the output frequency is controllable using the error signal.

These adjustments eventually lead to a lock condition where sample clock 230 of audio sink device 204 has reached a tolerable error from audio source device 202. This time to lock depends on the initial offset and the loop bandwidth of the closed loop control system. In order to minimize the initial offset, system 200 uses communication reference oscillator 232 to "preposition" audio reference oscillator 228 prior to receiving any samples from audio source device 202. By sending empty words over the same serial bus used to send the audio when there is active transmission from audio source device 202, the DSP of processing circuit 216 can adjust its controllable audio reference oscillator 228 for a small PPM (parts per million) error in synchronizing to audio reference oscillator 222 of audio source device 202. Once audio source device 202 starts sending data, it will be a short time to achieve the lock since audio sink device 204 has already "trained" its audio reference oscillator 228 to within an acceptable error using communication reference oscillator 232 as a reference.

Using this process will also obviate the need for manufacturing calibration which is commonly used to tune each device's operating frequency thus lowering production costs. This process can also compensate for long term drift of the oscillator frequency caused by device aging. Eliminating the need for factory calibration of oscillators will surely save time and money in production of hearing instruments. All of this is made possible by the addition of the highly accurate reference needed for RF wireless communication.

In various embodiments, synchronization may have to survive events such as lost packets while maintaining a close relationship between sample clocks 224 and 230. To do this, processing circuit 216 can be aided from the radio of wireless communication circuit 218 by being updated as to the status of a packet. This may include information from the radio as to whether a packet was empty, missed, or received with errors. Such link layer information can be sent through an interface between the radio of wireless communication circuit 218 and the DSP of processing circuit 216. The DSP can use this information to determine whether a packet loss concealment strategy should be employed to substitute the missing audio with silence, a previously received packet, or an interpolated packet based on linear prediction. In addition, this link layer information can be used to maintain the phase and frequency of sample clock 230. In hearing aid applications, in this way relative phase lock can be maintained between the left and right hearing aids (each being an audio sink device) with respect to each other and to the audio source device. Missed packets are much more easily identified by the radio which has employed time division multiple access techniques. These techniques have inherently good timing mechanisms with which to schedule packet arrivals. Should a scheduled receiving event take place without a received packet, the radio will immediately recognize this event and be able to inform the DSP of the missing packet.

Packets may be resent from audio source device 202 in an effort to improve the overall packet error rate performance of wireless link 206. These retransmissions can happen as a result of audio source device failing to receive an acknowledgement from audio sink device 204, or they can be sent unconditionally with a number of retransmissions as in the case of a one way or broadcast mode of transmission. In this case, it will be necessary for the link layer to inform the DSP that the successful reception was on a retransmission that may take place at a different time interval from the primary transmission. The DSP can adapt its synchronization timer with information from the link layer of the radio informing the DSP as to which of the transmissions the packet was successfully received. The transmission may be successful on the primary transmission or on one of the retransmission attempts. Without knowing this information from the link layer, the phase and frequency lock may be disturbed since the time of arrival or the packet at the DSP is used as the error signal to maintain the output sample clock.

In various embodiments, the radio of wireless communication circuit 218 sends information to the DSP of processing circuit 216 that a packet was missing or was sent as an empty packet to allow the DSP to insert a packet loss concealment (PLC) frame of information. This may be silent packet, replay or Linear predicted frame based on previous frames. In these embodiments, the radio is making this determination instead of relying on the DSP and its first-in-first-out (FIFO) pointer and crude RC timing to determine if a packet did not arrive.

In an alternative embodiment, one could use digital techniques to oversample the incoming signals and then interpolate and or decimate the output of a polyphase filter. The drawback is that it may require a higher sample rate and a multistage filter which require additional instructions or operations, thus increasing power consumption of the system. In another alternative embodiment, one could also use the signal processor to determine a missing packet event but with much less accuracy if its adjustable oscillator is prone to inaccuracy, which is the case with most adjustable oscillators.

Figure 3:
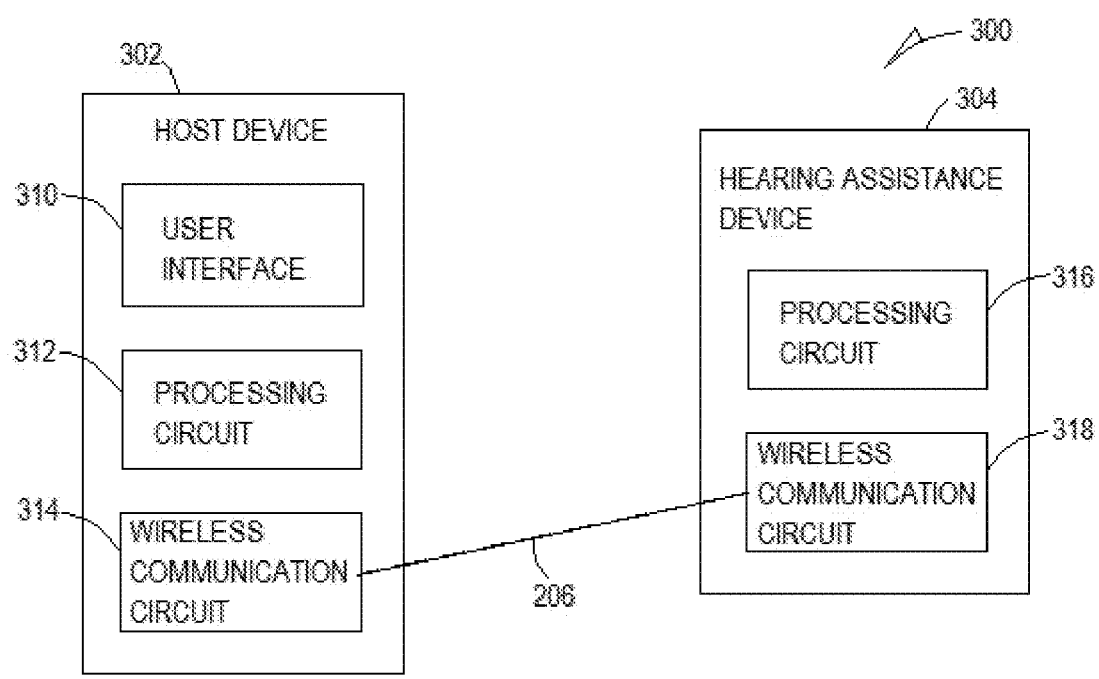
FIG. 3 is a block diagram illustrating an embodiment of a hearing assistance system including a host device and a hearing assistance device.

FIG. 3 is a block diagram illustrating an embodiment of a hearing assistance system 300. System 300 represents an example of system 100 or system 200 and includes a host device 302, a hearing assistance device 304, and communication link 206 providing for wireless communication between host device 302 and hearing assistance device 304. In various embodiments, host device 302 and hearing assistance device 304 may each include one or more devices. For example, host device 302 may include a computer or a computer connected to a communicator, and hearing assistance device 304 may include a single device or a pair of devices such as a pair of left and right hearing aids. In various embodiments, host device 302 includes any device that transmits acoustic signals to hearing assistance device 304. Examples of host device 302 include a hearing aid programmer, a computer, phone, and any devices capable of streaming audio to hearing assistance device 304. In one embodiment, communication link 206 includes a Bluetooth wireless connection.

In one embodiment, host device 302 includes an audio streaming device that streams audio to hearing assistance device 304. Examples of the audio streaming device include computer, television set, telephone, and any music or other audio player. In the illustrated embodiment, host device 302 includes a user interface 310, a processing circuit 312, and a wireless communication circuit 314. In various embodiments, user interface 310 includes a presentation device including at least a display screen and an input device. In various embodiments, the presentation device may also include various audial and/or visual indicators, and the user input device may include a computer mouse, a touchpad, a trackball, a joystick, a keyboard, a keypad, and/or various forms of switches. In one embodiment, user interface 310 includes an interactive screen such as a touchscreen functioning as both the presentation device and the input device. Processing circuit 312 represents an example of processing circuit 212 and is configured to perform various functions including those of processing circuit 212 as discussed in this document. Wireless communication circuit 314 represents an example of wireless communication circuit 214 and is configured to perform various functions including those of wireless communication circuit 214 as discussed in this document.

Hearing assistance device 304 includes a processing circuit 316 and a communication circuit 318. Processing circuit 316 represents an example of processing circuit 216 and is configured to perform various functions including those of processing circuit 216 as discussed in this document. Wireless communication circuit 318 represents an example of wireless communication circuit 218 and is configured to perform various functions including those of wireless communication circuit 218 as discussed in this document.

Figure 4:
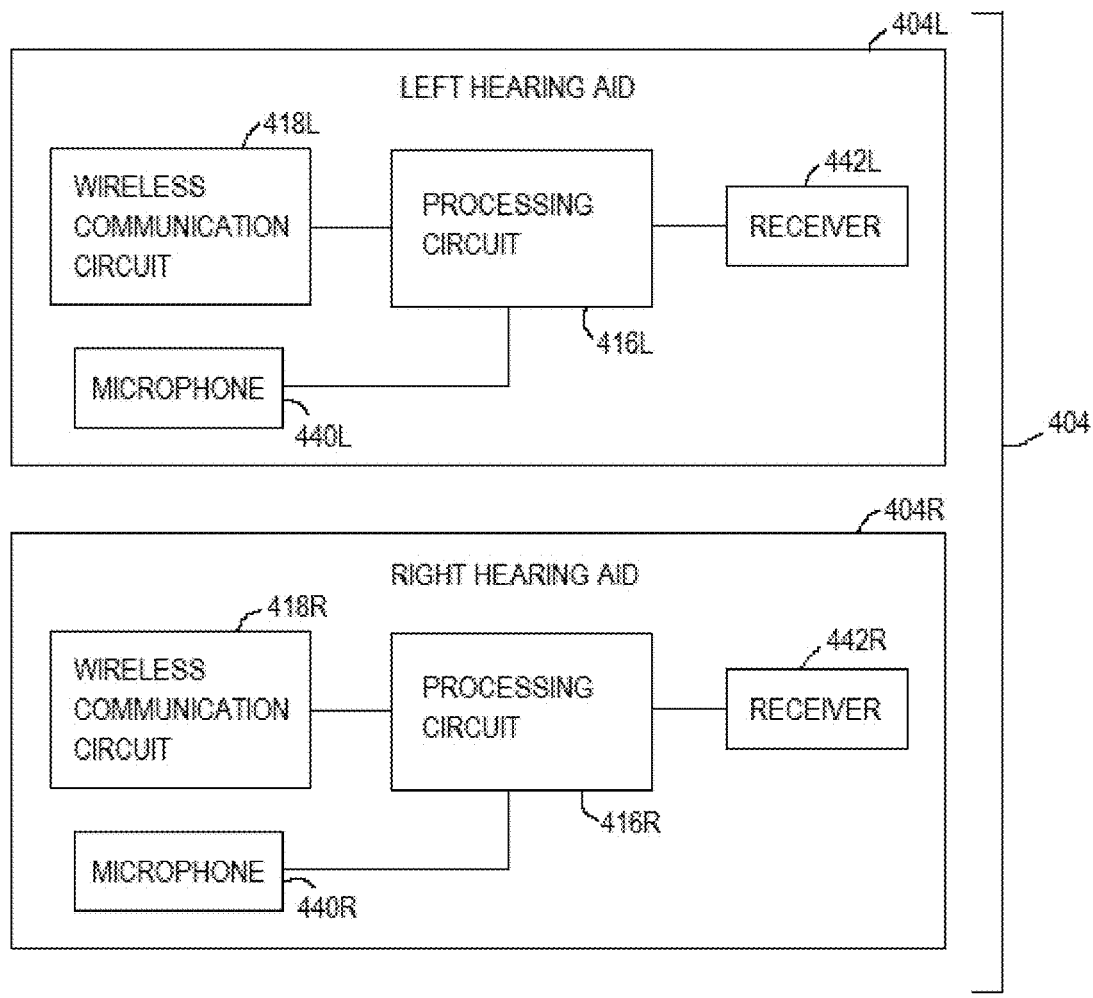
FIG. 4 is a block diagram illustrating an embodiment of a pair of hearing aids of the hearing assistance system.

FIG. 4 is a block diagram illustrating an embodiment of a pair of hearing aids 404 representing an example of hearing assistance device 304. Hearing aids 404 include a left hearing aid 404L and a right hearing aid 404R. Left hearing aid 404L includes a microphone 440L, a wireless communication circuit 418L, a processing circuit 416L, and a receiver (also known as a speaker) 442L. Microphone 440L receives sounds from the environment of the listener (hearing aid wearer). Wireless communication circuit 418L represents an example of wireless communication circuit 318 and wirelessly communicates with host device 302 and/or right hearing aid 404R, including receiving signals from host device 302 directly or through right hearing aid 404R. Processing circuit 416L represents an example of processing circuit 316 and processes the sounds received by microphone 440L and/or an audio signal received by wireless communication circuit 418L to produce a left output sound. Receiver 442L transmits the left output sound to the left ear canal of the listener.

Right hearing aid 404R includes a microphone 440R, a wireless communication circuit 418R, a processing circuit 416R, and a receiver (also known as a speaker) 442R. Microphone 440R receives sounds from the environment of the listener. Wireless communication circuit 418R represents an example of communication circuit 318 and wirelessly communicates with host device 302 and/or left hearing aid 404L, including receiving signals from host device 302 directly or through left hearing aid 404L. Processing circuit 416R represents an example of processing circuit 316 and processes the sounds received by microphone 440R and/or an audio signal received by wireless communication circuit 418R to produce a right output sound. Receiver 442R transmits the right output sound to the right ear canal of the listener.

In various embodiments, link layer information is used by processing circuit 216 (including its various examples discussed in this document) for audio phase lock loop (PLL) jitter reduction in system 100 and its various embodiments such as those discussed in this document. In an audio streaming device, maintaining the phase between the transmit clock and the audio rendering clock (such as sample clock 224 and sample clock 230, respectively) is very important. Not only does it ensure high audio quality by keeping the audio FIFO at the receiver (such as one of audio sink devices 104 including its various examples discussed in this document) at a suitable depth, but it also guarantees a defined phase difference between two decoders in a wireless stereo system. Maintaining the phase difference between the two ears is extremely important in providing the user with a high degree of audio fidelity. Differential phase disturbance between the two ears is perceived as a spatial change in sound location which can be quite annoying.

In one example, each audio packet is transmitted up to two times. If the first (primary) packet is not acknowledged by the receiver, then audio packet is sent again.

At the receiver, the audio PLL measures the time of arrival of the audio packet and uses that as an "error" variable to control its timing loop. Under ideal, error free conditions, the PLL loop will see a train of clean timing events generated by primary packets. These can be used to control the timing loop as defined by a classic PLL. When interference is encountered, the clean timing signal is replaced with a signal which has the following elements added to it:
  1. Secondary packets (the audio packet is received at a time (T/2) after the normal expected arrival time of a packet); and
  2. Missing packet (neither primary nor the secondary packet is received).

In a classic PLL, these timing errors cause jitter in the loop. To reduce this jitter, a loop filter with a suitable time constant is used. In the present system, such as system 100 and its various embodiments as discussed in this document, link layer information (such as information derived from the link layer of a Bluetooth device) is used to reduce jitter and maintain a fast loop response. To do this, the link layer is configured to provide the following information:
  1—Packet type: primary or secondary; and
  2—Missing packet, i.e., neither primary nor secondary packet has been received.

Figure 5:
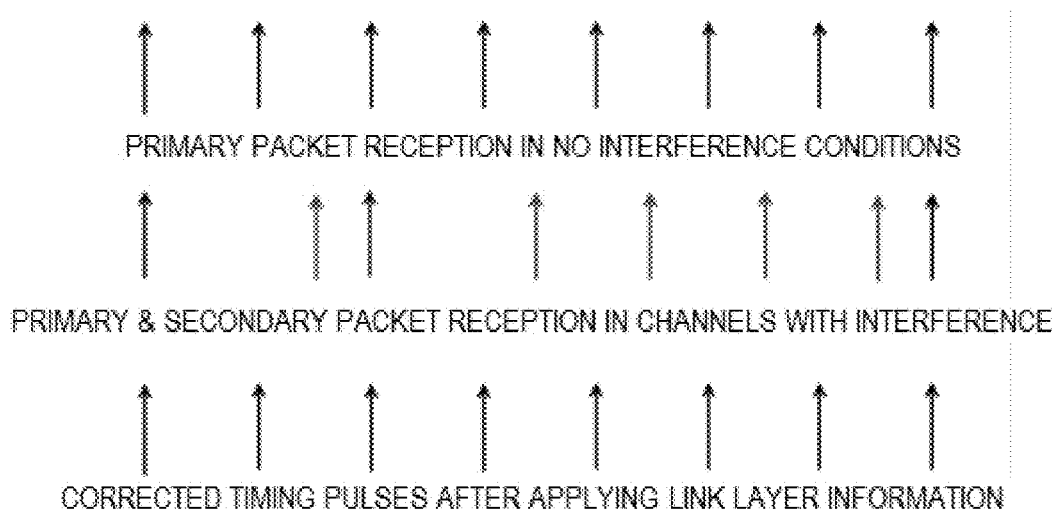
FIG. 5 is an illustration of an embodiment of operation of an algorithm for reducing jitter caused by disruption of packet arrival times due to interference.

Since the delay of each packet arrival time with respect to the expected arrival time is known, the PLL subtracts the known delay of the packet from the actual arrival time to arrive at an "ideal" error value. This is then used to control the loop in the normal manner. FIG. 5 shows the operation of such an algorithm for a case where packet arrival times are disrupted due to interference and corrected by applying link layer information.

It is understood that variations in communications protocols, antenna configurations, and combinations of components may be employed without departing from the scope of the present subject matter. Hearing assistance devices typically include an enclosure or housing, a microphone, hearing assistance device electronics including processing electronics, and a speaker or receiver. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the wearer.

It is understood that the processing circuit of the hearing aids referenced in this document (e.g., processing circuit 216 and its various examples) may be a digital signal processor (DSP), microprocessor, microcontroller, other digital logic, or combinations thereof. The processing of signals referenced in this application can be performed using the processing circuit. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), invisible-in-the-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for rendering audio in an audio system including an audio source device and an audio sink device wirelessly coupled to the audio source device, the method comprising:
    synchronizing a sample clock of the audio sink device to a sample clock of the audio source device using timing of packet transmission from the audio source device to the audio sink device; and
    maintaining the synchronization by driving an adjustable oscillator of the audio sink device based on time between arrivals of packets transmitted from the audio source device to the audio sink device and a number of encoded words received in each packet of the packets,
    wherein the audio sink device includes a hearing assistance device.

2. The method of claim 1, wherein synchronizing the sample clock of the audio sink device to the sample clock of the audio source device comprises synchronizing a sample clock a hearing aid to a sample clock of a host device configured to stream audio to the hearing aid.

3. The method of claim 2, comprising streaming audio from the host device to the hearing aid using a Bluetooth wireless connection.

4. The method of claim 1, wherein driving the adjustable oscillator of the audio sink device comprises driving a digital numerically controlled oscillator.

5. The method of claim 1, comprising transmitting a variable number of the encoded words in each packet of the packets.

6. The method of claim 5, comprising:
    forming an error signal based on a number of system clock signals expected between the packet arrivals; and
    adjusting the adjustable oscillator using the error signal.

7. The method of claim 6, further comprising using a communication reference oscillator of the audio sink device to preposition the adjustable oscillator prior to receiving the packets.

8. The method of claim 1, further comprising:
    receiving information regarding status of a packet of the packets from a radio of the audio sink device; and
    maintaining phase and frequency of the sample clock of the audio sink device using the information regarding the status of the packet.

9. The method of claim 8, further comprising determining whether to e ploy a packet loss concealment strategy using the information regarding the status of the packet.

10. The method of claim 8, wherein receiving the information regarding the status of the packet comprises receiving information indicative of whether the packet is successfully received on a retransmission of the packet.

11. A hearing assistance device configured to receive an acoustic signal including packets with variable numbers of encoded words transmitted from an audio source device having a first sample clock configured to time input sampling of the acoustic signal, the hearing assistance device comprising:
    a wireless communication circuit configured to receive the acoustic signal including the packets; and
    a processing circuit configured to process the received acoustic signal, the processing circuit including:
        an audio reference oscillator configured to generate an output sampling frequency; and a second sample clock configured to time output sampling of the acoustic signal based on the output sampling frequency, wherein the processing circuit is configured to synchronize the second sample clock to the first sample clock by adjusting the second sample clock using time between arrivals of the packets and the number of the encoded words in each packet of the received packets.

12. The hearing assistance device of claim 11, wherein the hearing assistance device comprises a hearing aid.

13. The hearing assistance device of claim 12, wherein the processing circuit is configured to adjust the audio reference oscillator using an expected number of clock signals between the arrivals of the packets.

14. The hearing assistance device of claim 13, wherein the wireless communication circuit comprises a communication reference oscillator, and the processing circuit is configured to preposition the audio reference oscillator using the communication reference oscillator prior to receiving the packets.

15. The hearing assistance device of claim 11, wherein the wireless communication circuit is configured to generate information regarding status of a packet of the packets, and the processing circuit is configured to maintain phase and frequency of the second sample clock using the information regarding the status of the packet.

16. The hearing assistance device of claim 15, wherein the processing circuit is configured to determine whether to employ a packet loss concealment strategy using the information regarding the status of the packet.

17. An audio system, comprising:
an audio source device including:
a source processing circuit configured to process an acoustic signal, the source processing circuit including a source audio reference oscillator configured to generate an input sampling frequency and a source sample clock configured to time input sampling of the acoustic signal based on the input sampling frequency; and
a source wireless communication circuit configured to transmit the acoustic signal; and an audio sink device including:
a sink processing circuit configured to process the acoustic signal transmitted from the audio source device, the sink processing circuit including a sink audio reference oscillator configured to generate an output sampling frequency and a sink sample clock configured to time output sampling of the acoustic signal based on the output sampling frequency; and
a sink wireless communication circuit configured to receive the acoustic signal,
wherein the audio source device is configured to transmit the acoustic signal including packets with various numbers of encoded words, and the audio sink device is configured to synchronize the sink sample clock to the source sample clock by adjusting the sink sample clock using time between arrivals of the packets at the audio sink device and the number of the encoded words in each packet of the packets,
wherein the audio sink device includes a hearing assistance device, and the audio source device includes a host device configured to be wirelessly coupled to the hearing assistance device.

18. The system of claim 17, wherein the audio sink device is configured to adjust the sink audio reference oscillator using an expected number of clock signals between the arrivals of the packets.

19. The system of claim 18, wherein the sink wireless communication circuit comprises a communication reference oscillator, and the audio sink device is configured to preposition the sink audio reference oscillator prior to receiving the packets.

20. The system of claim 17, wherein the sink wireless communication circuit is configured to generate information regarding status of a packet of the packets, and the audio sink device is configured to maintain phase and frequency of the sink sample clock using the information regarding the status of the packet.

21. The system of claim 20, wherein the sink processing circuit is configured to determine whether to employ a packet loss concealment strategy using the information regarding the status of the packet.

22. The system of claim 20, wherein the sink wireless communication circuit is configured to generate information indicative of whether the packet is successfully received on a retransmission of the packet, and the audio sink device is configured to maintaining phase and frequency of the sink sample using the information indicative of whether the packet is successfully received on the retransmission of the packet.

* * * * *